No. 894,731.

PATENTED JULY 28, 1908.

C. E. C. EDEY.
STUMP PULLER.
APPLICATION FILED JULY 16, 1907.

2 SHEETS—SHEET 1.

Witnesses
J. M. Fowler Jr.
L. R. Morrell

Inventor
Charles E. C. Edey

By Mason Fenwick & Lawrence
Attorneys

No. 894,731. PATENTED JULY 28, 1908.
C. E. C. EDEY.
STUMP PULLER.
APPLICATION FILED JULY 16, 1907.
2 SHEETS—SHEET 2.
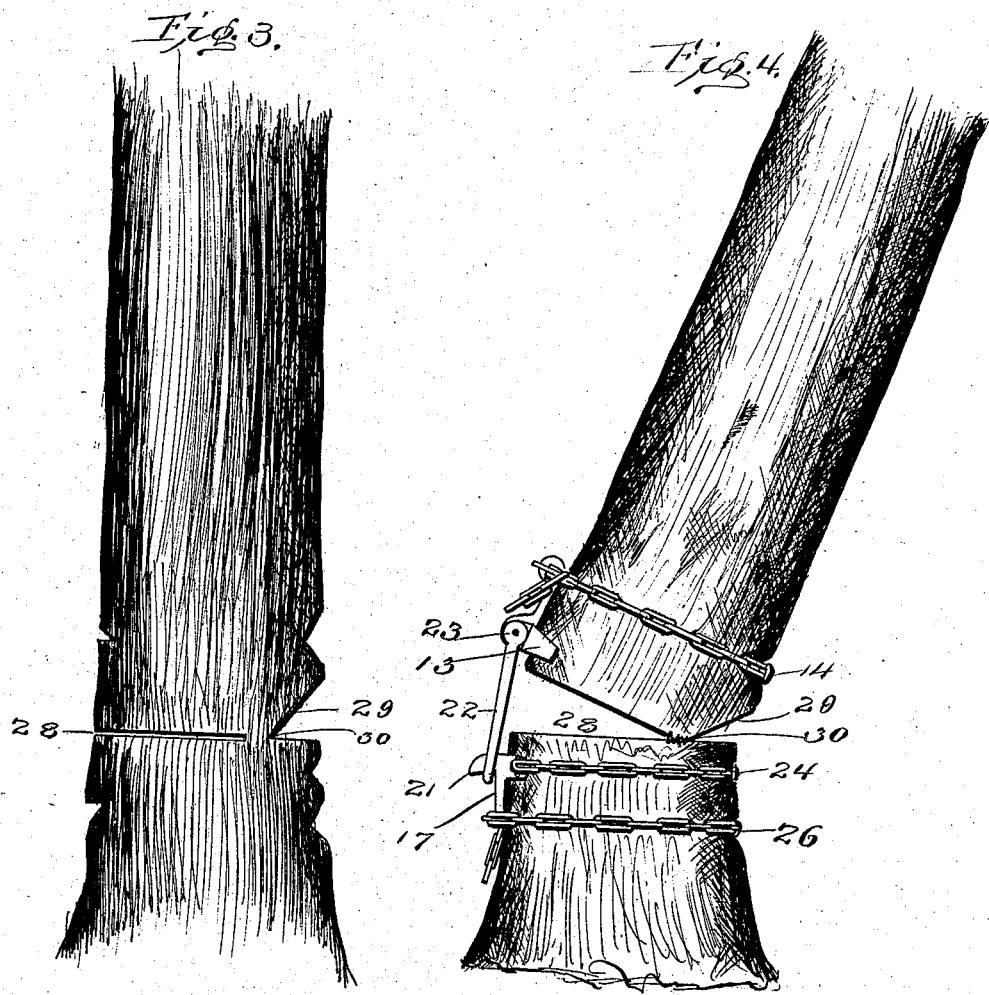

UNITED STATES PATENT OFFICE.

CHARLES E. C. EDEY, OF TACOMA, WASHINGTON.

STUMP-PULLER.

No. 894,731.  Specification of Letters Patent.  Patented July 28, 1908.

Application filed July 16, 1907. Serial No. 383,995.

*To all whom it may concern:*

Be it known that I, CHARLES E. C. EDEY, a subject of the King of Great Britain, residing at Tacoma, in the county of Pierce and State of Washington, have invented certain new and useful Improvements in Stump-Pullers; and I do hereby declare the following to be a full, clear, and exact description of the invention, such as will enable others skilled in the art to which it appertains to make and use the same.

This invention relates to stump pullers, and has for an object to provide means for employing the leverage of a tree trunk for the purpose of pulling the stump.

A further object of the invention is to provide means for securing together the severed trunk of a tree and the stump in such manner that the greatest amount of leverage is provided by the tree trunk.

A further object of the invention is to provide means for encircling and engaging a tree trunk with other means for encircling and engaging the stump, and with means for connecting the two engaging means together to act as a combined device.

A further object of the invention is to provide in a stump puller means adapted to be connected to a tree both above and below the line of cut, after which the tree may be sawed nearly off, the device then connected up and a cut made upon the opposite side to provide the necessary inclination to the tree trunk.

With these and other objects in view, the invention comprises certain novel constructions, combinations and arrangements of parts, as will be hereinafter fully described and claimed.

Figure 1:
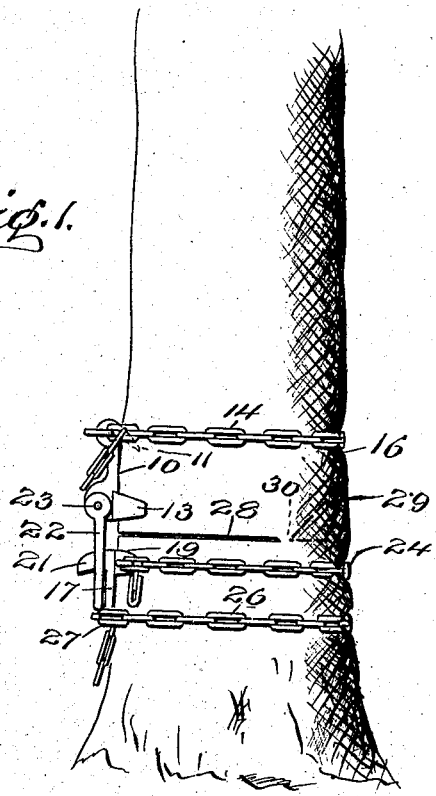
Figure 2:
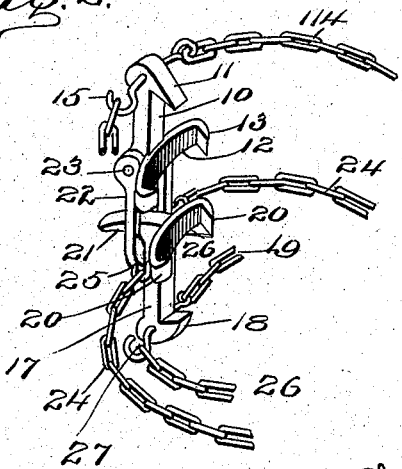

In the drawings:—Figure 1 is a view in side elevation of the improved stump puller attached to a tree and stump in operative position. Fig. 2 is a view in perspective of the improved stump puller disengaged. Fig. 3 is a view in elevation of a tree provided with the several cuts required to position the device upon the tree and to insure the proper falling of the tree, such cuts being impossible without the device being disposed upon the tree. Fig. 4 is a view in side elevation of a tree trunk with the device placed thereon and the tree at the required inclination to pull the stump.

Like characters of reference designate corresponding parts throughout the several views.

The improved stump puller forming the subject-matter of this application, comprises a member 10 embodying an elongated shank portion having at one end a tang 11 adapted to be driven into the surface of a tree and with laterally extending arms 12 preferably terminating in sharpened lugs 13 also capable of being driven into the surface of the tree. The device is positioned upon the tree by driving the tang 11 into the side and securing it in position by means of a chain, as 14, which extends circumferentially about the tree and engages upon a hook 15, the chain being preferably disposed within the cut or notch 16 upon the opposite side of the tree.

In association with the member just described a second member is employed comprising a shank 17 having a tang 18 formed upon one extremity with laterally extending arms 19 formed upon the other end with lugs 20 similar to the lugs 13. The shank 17 carries at its end opposite the tang 18 an arm 21 extending outwardly opposite from the tree and proportioned to be engaged by a yoke 22 pivoted as at 23 to the member 10. The member embodying the shank 17 is secured upon the stump portion of the tree by driving the tang 18 into the side surface thereof and is preferably secured by means of a chain 24 encircling the tree and adjustably secured to the hook 25 and by the lower chain 26 encircling the tree and secured to the hook 27.

The members embodying the shanks 10 and 17 may be secured upon the tree at the required distance with the yoke 22 disengaged from the arm 21 and when in such position a saw cut 28 may be made in the tree to nearly sever the tree in the usual manner of forming saw cuts, whereupon the saw may be removed and the yoke 22 swung pivotally into engagement with the arm 21. After connecting the two parts together by the yoke 22 a cut 29 may be made in the opposite side of the tree as by the employment of an ax nearly or quite severing the tree and connecting with the saw cut 28 whereby, by reason of the slack of the chain and the yoke 22, the tree trunk will pivot upon the point 30 to an inclination in such position that power can be applied thereto to remove the stump when found necessary but in most cases the weight of the tree and the impetus of movement from a vertical will be sufficient to pull the stump without the application of power. It will thus be seen that the weight of the trunk and its top branches is employed to pull the stump, such tree, after being cut, being at the inclination to exert approximately the greatest force upon the stump.

By the employment of the stump pulling apparatus above described it is found that in a great majority of cases no power is required to dislodge the stump from the earth, other than by the power exerted by the leverage exerted by the severed tree, either by the angle of inclination shown at Fig. 4, or a similar angle whereby the leverage of the tree is employed by the weight of the trunk and its branches to uproot the stump, as the tree falls.

It will be noted that the tangs 11 and 18 are formed at such an inclination as to be drawn more deeply into the wood of the tree and stump by the application of greater power and that the lugs or tangs 13 and 20 will also be engaged within the wood and that as the tree moves pivotally relative to the stump, such pivotal movement will be accommodated by the pivot 23.

What I claim is:—

1. In a stump puller, means adapted to engage a tree trunk, means adapted to engage the stump of the tree, and a yoke adapted to connect the parts after the tree is partly severed from the stump.

2. In a stump puller, means to connect a tree to its stump, means to permit a limited inclination of the tree relative to the stump, said means comprising a yoke carried by said tree adapted to engage an extension on said stump, and means to employ the leverage of the tree trunk to remove the stump.

3. In a stump puller, means adapted to engage the side of a tree, means embracing the tree adapted to secure the member in position, a member adapted to engage the side of the stump, means adapted to embrace the stump and secure the member in position, and means connecting the two members adapted to permit limited angular movement of the tree relative to the stump.

4. In a stump puller, a member adapted to engage the side of a tree, means adapted to secure the member to the tree, a member adapted to engage the side of a stump, means adapted to secure the last-named member to the stump, and pivoted engaging means carried by one of the members adapted to engage the other member.

5. In a stump puller, a member adapted to engage the side of a tree trunk, means adapted to embrace the tree and secure the member in position, a member adapted to engage the side of the stump, means adapted to embrace the stump and maintain the member in position, an upstanding arm carried by one member, and a yoke pivoted to the other member adapted to engage upon the outstanding arm.

In testimony whereof I affix my signature in presence of two witnesses.

CHARLES E. C. EDEY.

Witnesses:
J. B. KEENER,
PEARL COE KEENER.